United States Patent
Bartling

(10) Patent No.: US 8,073,591 B2
(45) Date of Patent: Dec. 6, 2011

(54) METHOD AND APPARATUS FOR MONITORING SAND SUPPLY TO A SCATTERING DEVICE FOR A RAIL VEHICLE

(75) Inventor: Werner Bartling, Elze (DE)

(73) Assignee: Faiveley Transport, Saint-Denis (FR)

( * ) Notice: Subject to any disclaimer, the term of this patent is extended or adjusted under 35 U.S.C. 154(b) by 361 days.

(21) Appl. No.: 12/440,709

(22) PCT Filed: Sep. 20, 2007

(86) PCT No.: PCT/EP2007/008172
§ 371 (c)(1),
(2), (4) Date: Mar. 10, 2009

(87) PCT Pub. No.: WO2008/037389
PCT Pub. Date: Apr. 3, 2008

(65) Prior Publication Data
US 2009/0254231 A1    Oct. 8, 2009

(30) Foreign Application Priority Data
Sep. 26, 2006    (AT) .................. A 1601/2006

(51) Int. Cl.
*G05D 1/00* (2006.01)
(52) U.S. Cl. .............. 701/36; 701/19; 291/3; 291/2; 73/861
(58) Field of Classification Search ........... 701/19, 701/20, 36, 45; 73/861.77, 861.78, 861, 73/861.353; 291/2, 3, 17, 32, 38
See application file for complete search history.

(56) References Cited

U.S. PATENT DOCUMENTS

| | | | |
|---|---|---|---|
| 528,998 A | 11/1894 | Thomas | |
| 769,929 A | 9/1904 | Allenbach | |
| 772,218 A | 10/1904 | Cooper | |
| 867,055 A | 9/1907 | Kubicek | |
| 872,104 A | 11/1907 | Bacon | |
| 2,334,181 A | 11/1943 | Elston | |
| 2,522,677 A | 9/1950 | Kelly | |
| 2,724,969 A * | 11/1955 | Bloser | 340/870.34 |
| 3,568,937 A | 3/1971 | Grataloup | |
| 3,662,922 A | 5/1972 | Gesior | |
| 3,827,736 A | 8/1974 | Mango | |
| 3,949,908 A | 4/1976 | Baillie | |
| 4,145,894 A | 3/1979 | Frank et al. | |

(Continued)

FOREIGN PATENT DOCUMENTS

CH    423 860    5/1967

(Continued)

OTHER PUBLICATIONS

English Translation of the Written Opinion of The International Searching Authority for PCT/EP2007/008172 filed Sep. 20, 2007.

(Continued)

*Primary Examiner* — Mark Le
(74) *Attorney, Agent, or Firm* — Martin Fleit; Paul D. Bianco; Fleit Gibbons Gutman Bongini & Bianco PL

(57) ABSTRACT

A method, and an apparatus, for monitoring the sand supply in a sand tank (2) of a sand-scattering device in vehicles, in particular in express trains. To prevent an insufficient sand supply, the sand-supply level is monitored by a inspection point.

7 Claims, 2 Drawing Sheets

U.S. PATENT DOCUMENTS

| | | |
|---|---|---|
| 4,930,685 A | 6/1990 | Landers |
| 5,609,059 A * | 3/1997 | McEwan ............ 73/290 R |
| 5,725,160 A | 3/1998 | Harper et al. |
| 5,785,212 A | 7/1998 | Steiger |
| 5,795,108 A | 8/1998 | Lightle |
| 6,629,709 B1 * | 10/2003 | Tunley et al. ............ 291/2 |
| 6,938,935 B2 | 9/2005 | Bartling |
| 7,128,284 B2 | 10/2006 | Bartling |
| RE40,735 E | 6/2009 | Bartling |
| 2004/0195370 A1 * | 10/2004 | Bartling ............ 239/302 |
| 2007/0084283 A1 * | 4/2007 | Carlson et al. ............ 340/621 |
| 2008/0252082 A1 | 10/2008 | Bartling |

FOREIGN PATENT DOCUMENTS

| | | |
|---|---|---|
| DE | 1480718 | 8/1969 |
| DE | 21 11 843 | 9/1972 |
| DE | 41 27 016 | 2/1993 |
| DE | 195 47 746 | 7/1996 |
| DE | 101 05 525 | 9/2001 |
| DE | 100 44 608 | 4/2002 |
| DE | 102 52 466 | 5/2004 |
| EP | 0 149 417 | 12/1984 |
| EP | 0 178 289 A1 | 4/1986 |
| EP | 0 378 066 | 11/1989 |
| EP | 0 499 199 A2 | 8/1992 |
| EP | 0 534 828 A1 | 3/1993 |
| EP | 0 656 529 A1 | 6/1995 |
| RU | 2 283 788 C1 | 9/2006 |
| WO | 98/06591 | 2/1998 |
| WO | 00/71399 A1 | 11/2000 |
| WO | 01/68431 | 9/2001 |
| WO | 2005/077679 A1 | 8/2005 |
| WO | 2007/045310 A1 | 4/2007 |

OTHER PUBLICATIONS

International Search Report published Apr. 3, 2008 for PCT/EP2007/008172 filed on Sep. 20, 2007.

Austrian Search Report dated May 21, 2007 for Austrian application No. A1601/2006 (to which this application claims priority).

* cited by examiner

METHOD AND APPARATUS FOR MONITORING SAND SUPPLY TO A SCATTERING DEVICE FOR A RAIL VEHICLE

FIELD OF THE INVENTION

The invention relates to a method, and an apparatus, for monitoring and preparing the sand supply in a sand tank of sand-scattering devices in vehicles, in particular in rail vehicles.

BACKGROUND OF THE INVENTION

In rail vehicles, sand-scattering devices are part of those systems that are to be assigned to vehicle-safety equipments, to the brake and drive technology. They fulfill the task of improving the friction coefficient between the vehicle wheels and the rails (during braking or accelerating the vehicle) in case of insufficient static friction.

Amounts of sand are usually defined, and/or predefined, by project-specific specification sheets of the client, which is why a separate control unit is necessary for adjusting the amounts of sand independently.

The inductive sensor serves for actual-data detection only.

From WO 2005/077679, a device for monitoring the gritting-material flow in vehicles is known, with sensors being arranged in the region of the gritting-material flow which are provided with a means evaluating the data detected. The system is connected to a display means in the driver's cabin of the vehicle.

From EP 0499 199 A2, an independently acting sand-level indicating means is known which independently detects the sand volume in the container in an optical manner by weight-difference measurement, and which then induces display of the same.

In WO 2000/071399 A1, a detector for detecting the sand level of a container, in particular a sand container, is described. An electric signal of a sensor is transmitted to a control device which is connected to a display means in the driver's cabin.

From EP 0656 529 A1, a detector for detecting the sand level in a container of a sanding apparatus is known. If a certain filling quantity is fallen short of, an alarm will be sent to the driver.

A similar apparatus is known from RU 2 283 788 C1.

All apparatuses known have failed to satisfy the requirements imposed as regards operational safety.

SUMMARY OF THE INVENTION

It is the object of the invention to create an operational-safe monitoring and analyzing system capable of increasing the active operational safety of rail vehicles by continuous operational-data detection, and evaluation, by storing all essential data detected during the operation of the sand-scattering devices for evaluation purposes, and by appropriately forwarding all data important for the current driving operation to the vehicle control and/or the driver's cabin, and by displaying the same.

This object is achieved by the method and apparatus of the present invention.

According to a further feature of the invention, the sand volume is regulated by a star feeder whose speed is measured, and according to a further feature of the invention, the product of sand volume by consumption per time unit is made visible at an inspection point. These measures allow for the driver to determine for how long a certain sand supply will be sufficient, at least by consulting a table. The drive of the star feeder is controlled by means of an independent electronic control-unit speed (amounts of sand), e.g. via a fixedly set speed (constant amount of sand) or via a speedometer signal from the vehicle control with a stepless sand-amount control adapted in a manner analog to the vehicle speed (stepless sand-amount adaptation proportionally to the driving speed).

The sand-supply tank is of a defined geometry, thus having a constant sand-filling volume. The discharge volume in a star feeder can be calculated from the volume of a star-feeder cell and speed and/or the speed pulses.

According to a further feature of the invention, a corresponding maintenance signal for the sand-scattering device is sent to the vehicle control and/or the driver's cabin and/or to the maintenance workshop when a predefined, effective operational time is reached.

A further feature of the invention resides in transforming, in calculational form, the current sand consumption during a sand-scattering procedure (constant sand-discharge volume/star feeder×speed pulses), as well as in storing data.

A further advantage is the continuous detection of the sand supply in the sand-supply tank in calculational form.

The sand-supply tank is of a defined geometry, thus having a constant sand-filling volume.

The sand-supply tank comprises a sensor (capacitive switch, e.g.) which detects the maximum sand-filling level when the tank is being filled, forwards the same to the computational unit for resetting the sand-filling indicator in the vehicle's cabin to "full tank".

In each sand-scattering procedure, the defined sand volume in the sand-supply tank is reduced in calculational manner by the effective sand consumption, the respective remaining sand-filling level is calculated, stored and forwarded to the driver's cabin. In the cabin, the value can be requested, or displayed, and when a defined remaining (reserve) sand-filling volume is reached an alarm is triggered.

Thanks to the inventive control, in case of danger or dangerous areas on certain routes, the track sections in the railway network and driving operation, respectively, can be detected. To ensure a fail-safe discharge of the sand flow from the sand tank, it is useful to provide the sand tank with a shaker which is fixed to the tank-retention means via two magnets, e.g., and is excited with a frequency of 10 Hz, e.g.

According to a further feature of the invention, there is provided a multi-stage adjustment of the dosing means and/or the frequency for the shaker.

BRIEF DESCRIPTION OF THE DRAWINGS

Further details of the invention will be explained in more detail by way of the drawings. Therein.

DETAILED DESCRIPTION OF THE INVENTION

Figure 1:
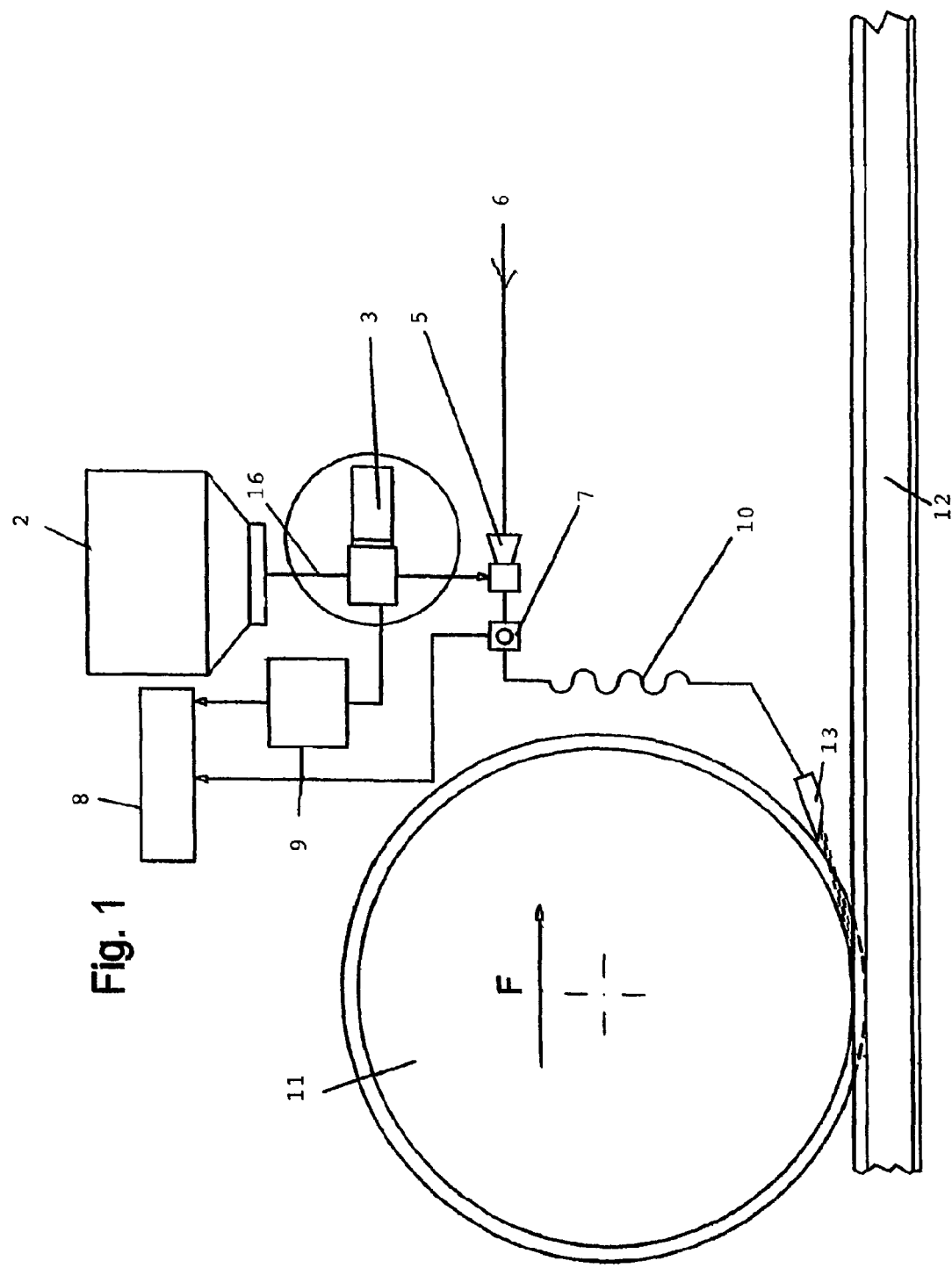
FIG. 1 shows a schematic representation of the control system.
Figure 2:
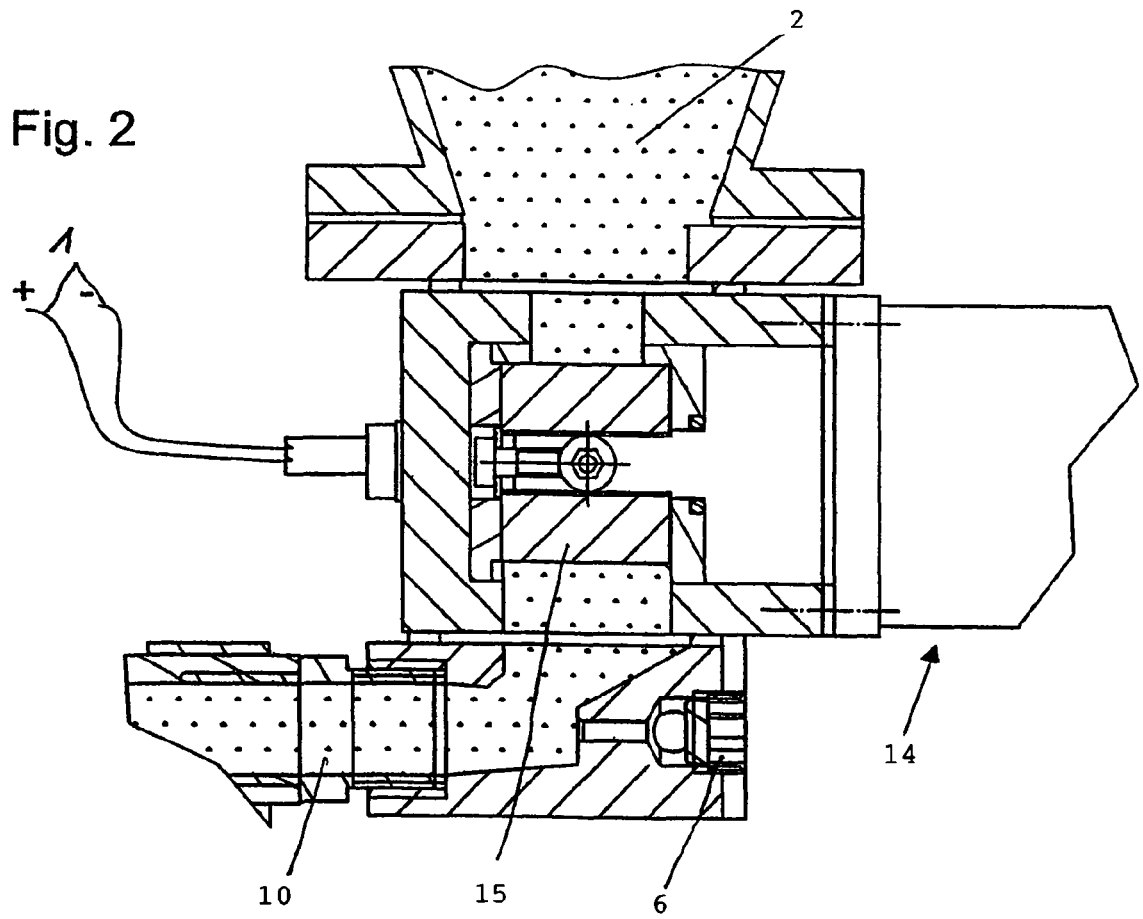
FIG. 2 shows a cross-section through the sand-supply tank, the adjoining devices included.

The sand is fed from a sand-supply tank 2 of a dosing means, for example a star feeder, whose speed can be detected by an inductive speed sensor, e.g. In FIG. 1, the speed sensor is designated by 3.

In the block diagram, there is a supply tank 2 within which the sand is fed to an injector 5 via a line 16, from which injector 5 the sand is fed by means of pressurized air from a pressurized-air line 6 via a diagnosis system 7, and a sand line 10, to a scattering tube 13, with the sand discharging from the latter in the region of the wheel 11. The diagnosis system consists of sensors which are provided in the region of the sand flow and have a means that evaluates the data detected, with photosensors preferably being arranged to oppose each other or to run in parallel next to each other (reflector system), and guided to a computational unit 8, including a data memory, the data being fed from the computational unit 8 to a vehicle control and/or a driver's cabin. The computational unit 8 is connected to a pulse counter 9 which counts the revolutions of the star feeder.

The speed sensor 3 which, for example, is inductive, and the star feeder 15 which is driven by the engine 14 feed the sand into the sand line 10 at dosed amounts from where it is fed by the pressurized air from the pressurized-air line 6 to the scattering tube 13 which feeds the sand to in front of the wheel 11, as indicated, said wheel in the present case rotating in the direction of arrow F.

The inventive procedural method and apparatus allow for the driver to determine for how long a current sand supply will be sufficient and when refilling will be necessary, at least by consulting a table and the data evaluated or via an automated display means; moreover, maintenance of the sand-scattering device can be planned precisely in a utilization-dependent manner.

An existing railway network may be divided, e.g, into track sections so as to enable precise calculation of sand consumption per time unit, and track unit, in a manner dependent on the current operational conditions, and to enable recognition of particularly dangerous areas in the route network.

The invention claimed is:

1. A method of monitoring a sand supply in a sand tank of a sand-scattering device including serially a sand line and a scattering tube for scattering sand in a region of a wheel for a rail vehicle including the steps of:
    (a) providing a computational unit including a memory;
    (b) providing a star wheel for receiving sand from the sand tank and feeding received sand into the sand line;
    (c) interposing serially an injector and a diagnostic system between the star wheel and the sand line;
    (d) introducing pressurized air into the injector to drive sand through the sand line and the scattering tube;
    (e) driving the star wheel in response to sensed operating vehicle speed;
    (f) continually sensing and providing first sensed output pulses indicative of speed of rotation of the star wheel;
    (g) transmitting the first sensed output pulses to the computational unit;
    (h) continually sensing by the diagnostic system and providing second sensed output of sand being passed through the sand line;
    (i) transmitting the second sensed output to the computational unit;
    (j) determining based on computation (1) how long current sand supply will continue to be available and when refilling of the sand tank will be necessary based on consumption per unit time, track unit and current operational rail conditions, and (2) when maintenance of the sand-scattering device will be required based on utilization; and
    (k) displaying at an inspection point at least one determination of step (j).

2. The method of claim 1 including a further step of determining in step (j), the consumption of sand per unit time.

3. The method of claim 2 including driving the star wheel in a stepless manner as a function of driving speed.

4. Apparatus monitoring a sand supply in a sand tank of a sand-scattering device including serially a sand line and a scattering tube for scattering sand in a region of a wheel for a rail vehicle comprising:
    (a) a computational unit including a memory;
    (b) a star wheel for receiving sand from the sand tank and feeding received sand into the sand line;
    (c) an injector and a diagnostic system interposing serially between the star wheel and the sand line;
    (d) pressurized air line connected to the injector to drive sand through the sand line and the connected scattering tube;
    (e) a control unit controlling the star wheel in response to sensed operating vehicle speed;
    (f) a sensor configured to continually sense and provide first sensed output pulses indicative of speed of rotation of the star wheel;
    (g) the computational unit connected to the sensor for receiving the output pulses;
    (h) the diagnostic system continually sensing and providing a second sensed output of sand being passed through the sand line;
    (i) the computational unit configured to receive the second sensed output;
    (j) the computational unit configured to perform the following determinations: (1) how long current sand supply will continue to be available and when refilling of the sand tank will be necessary based on consumption per unit time, track unit and expected rail conditions, and (2) when maintenance of the sand-scattering device will be required based on utilization; and
    (k) a device at an inspection point displaying at least one of said determinations.

5. Apparatus according to claim 4, wherein the sensor for providing said first sensed output pulses includes a selenium cell.

6. Apparatus according to claim 4, wherein the control unit controlling the star wheel is a separate electronic control unit.

7. Apparatus according to claim 4, wherein a shaker device is mounted on the sand tank to insure a fail-safe discharge of sand flow from the sand tank.

* * * * *